United States Patent [19]

Pickhardt

[11] 4,260,300
[45] Apr. 7, 1981

[54] METHODS AND APPARATUS FOR FORMING HOLES IN WORKPIECES

[75] Inventor: Dankwardt Pickhardt, Fürth, Fed. Rep. of Germany

[73] Assignee: Sandvik Aktiebolag, Sandviken, Sweden

[21] Appl. No.: 32,740

[22] Filed: Apr. 24, 1979

[30] Foreign Application Priority Data

May 3, 1978 [DE] Fed. Rep. of Germany ....... 2819504

[51] Int. Cl.³ ..................... B23B 35/00; B23B 39/22
[52] U.S. Cl. ...................................... 408/1 R; 408/41
[58] Field of Search .................. 408/1, 41, 54, 53, 37, 408/39; 144/150

[56] References Cited

U.S. PATENT DOCUMENTS 718,863   1/1903   Norris ..................................... 408/41
1,487,589 3/1924  Miner et al. ........................... 408/54

FOREIGN PATENT DOCUMENTS 700440 12/1953 United Kingdom ..................... 408/41

Primary Examiner—Z. R. Bilinsky
Attorney, Agent, or Firm—Burns, Doane, Swecker & Mathis

[57] ABSTRACT

A hole is formed in a workpiece by advancing together a pair of cutter-carrying boring bars from opposite sides of the workpiece. Rotation of the boring bars is synchronized to maintain the cutter-carrying portion of each boring bar in alignment with an axial recess in the boring bar. As the boring bars converge, the cutter-carrying portions enter the respective recesses whereby the cutter bits pass one another axially to complete the hole. The axes of rotation can be aligned to form a circular hole, or mutually spaced to form an oval hole.

3 Claims, 9 Drawing Figures

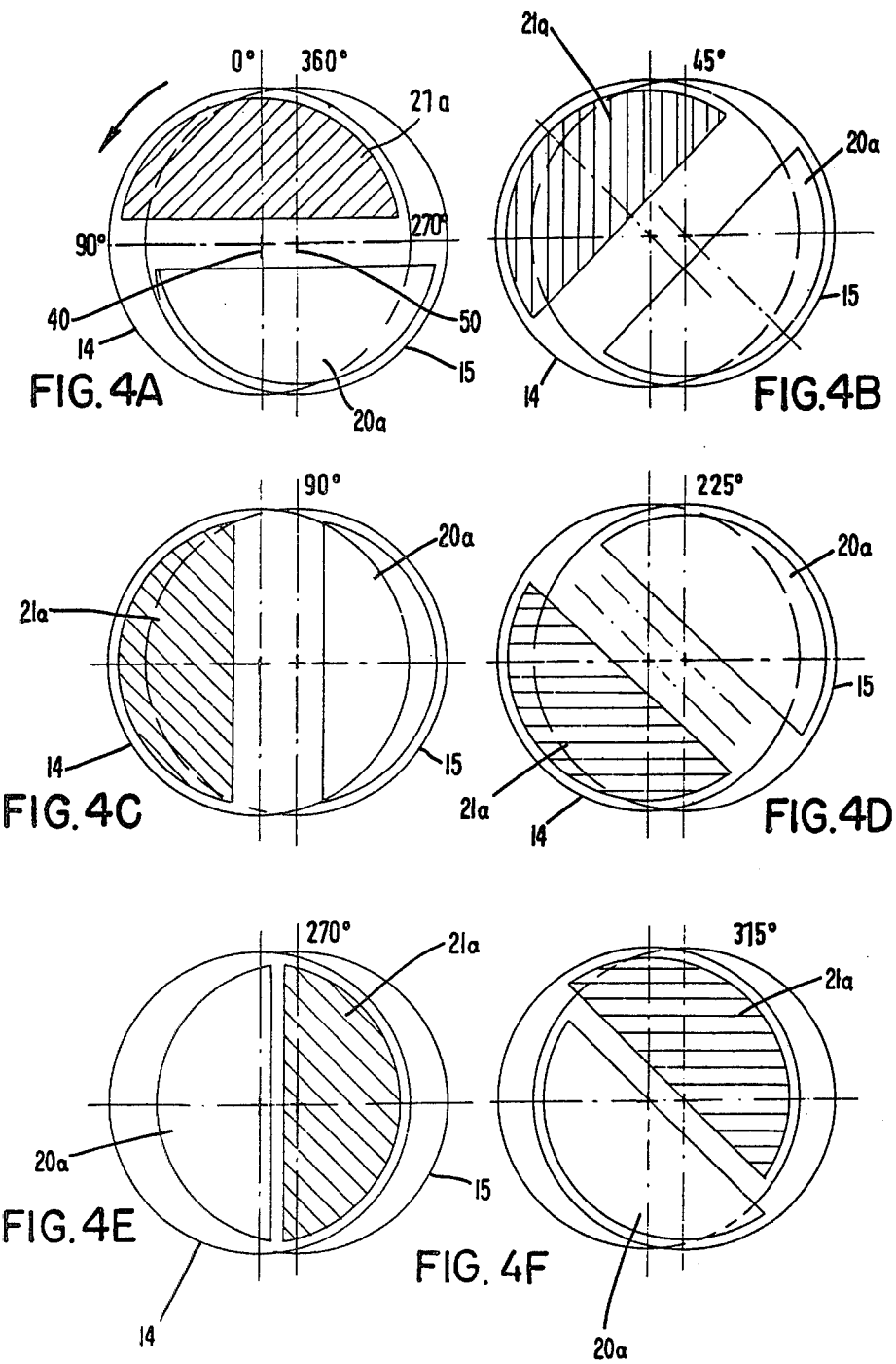

METHODS AND APPARATUS FOR FORMING HOLES IN WORKPIECES

BACKGROUND AND OBJECTS OF THE INVENTION

The present invention relates to methods and apparatus for reaming or boring a hole in a workpiece by means of two oppositely facing tools which are fed towards each other from opposite sides of the hole.

It is previously known to drill holes in workpieces by means of two oppositely faced drills. Such a method is described for instance in British Pat. No. 700,440. The problem to be solved by that patent was that the drilling of holes of considerable length through a component took so long, it was needful to try saving manufacturing time in connection therewith. For the solution of this problem it was proposed to use a pair of oppositely facing, axially aligned drills which are to be fed towards each other until they nearly meet. Thereafter, the feed of one drill is reversed while the other is fed forwardly to drill through the material remaining therebetween. One drawback of such an arrangement is that the drills are not able to pass each other during drilling.

It is, therefore, an object of the present invention to provide novel methods and apparatus for reaming or boring holes from opposite directions.

It is a further object to enable the cutter elements to pass one another during the reaming or boring operation.

An additional object of the invention is to enable holes of oval shape to be formed.

SUMMARY OF THE INVENTION

Those objects are achieved in accordance with the present invention, wherein a hole is reamed or machined by means of two oppositely faced tools of such design that they can pass each other during a boring operation. In that regard, each tool includes a boring bar which carries an eccentrically located cutting element and which forms an axial recess capable of receiving the cutting element of the other boring bar as the tools "pass" each other in the hole. Compared with prior techniques, this eliminates the need for retreating one tool so as to enable the other to complete the boring operation. One result of our proposed method and apparatus is that they can well be applied to the boring operation of holes in oval shape by spacing apart the rotary axes of the respective boring bars. Usually, holes oval in shape are produced by broaching or milling which is time and cost consuming. With the present invention it is possible to reduce manufacturing time and costs.

The principle of the present invention also applies to reaming or boring of circular holes.

BRIEF DESCRIPTION OF THE DRAWING

The invention will now be explained in greater detail with reference to the accompanying drawings, which illustrate a preferred embodiment of the present invention and in which:

FIGS. 4A through 4F show the relative positions of the spindles during one revolution.

DETAILED DESCRIPTION OF A PREFERRED EMBODIMENT OF THE INVENTION

Figure 1:
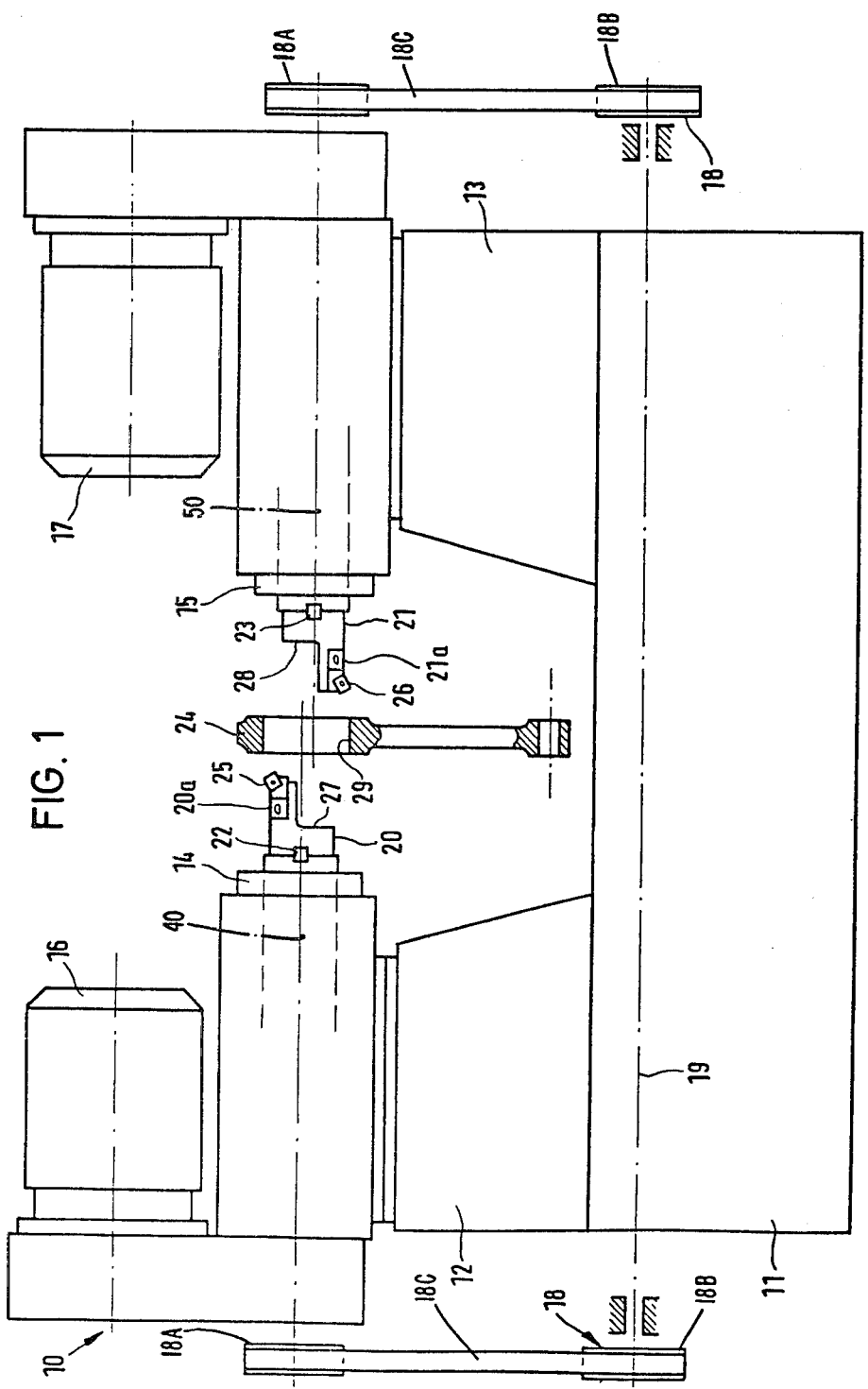
FIG. 1 shows a schematic side-view of a cutting tool machine equipped with a pair of oppositely faced spindles and tools arranged for forming an oval hole, through a workpiece shown in longitudinal cross-section.

Referring to FIG. 1, a cutting tool machine 10 comprises two stands 12, 13 mounted on a common base 11. Each stand includes a housing in which a work spindle 14, 15 is rotatably received. A pair of electric drive mechanisms 16, 17 are supported by the housings and are coupled to respective spindles to rotate and axially feed the latter in conventional fashion. The machine 10 includes conventional mechanically or electronically actuated drive-equalizing mechanisms 18. The mechanically drive-equalizing mechanism comprises a drive wheel 18A coupled for rotation to the associated spindle, a drive wheel 18B, and an endless toothed belt or sprocket chain or gear drive 18C drivingly interconnecting the wheels 18A, 18B. Interconnecting the driven wheels 18B is an axial transmission, schematically indicated at 19, which ensures that the spindles 14, 15 travel at equal speed and at a constant angle of rotation relative to each other. For electronically drive equalizing, the described mechanically connecting is not enough Each spindle 14, 15 is arranged to receive a boring bar 20, 21 that is coupled for rotation to the spindle by a driving key 22,23 in a conventional manner, so as to be capable of reaming or producing a hole in a workpiece 24. The free end of each boring bar 20, 21 carries a cutting insert 25, 26 located eccentrically relative to the axis of rotation of the bar. The inserts 25, 26 each comprise preferably sintered carbide and are secured to the bar in any suitable way, such as mechanically or by brazing.

Each bar 20, 21 is provided with an axially extending recess 27, 28 of such radial depth that the insert-carrying portion of one boring bar is able to enter the recess of the other bar and pass the insert-carrying portion of the latter during a boring operation. The insert-carrying portion of each boring bar should lie entirely outside the rotary axis of the boring bar.

Figure 2:
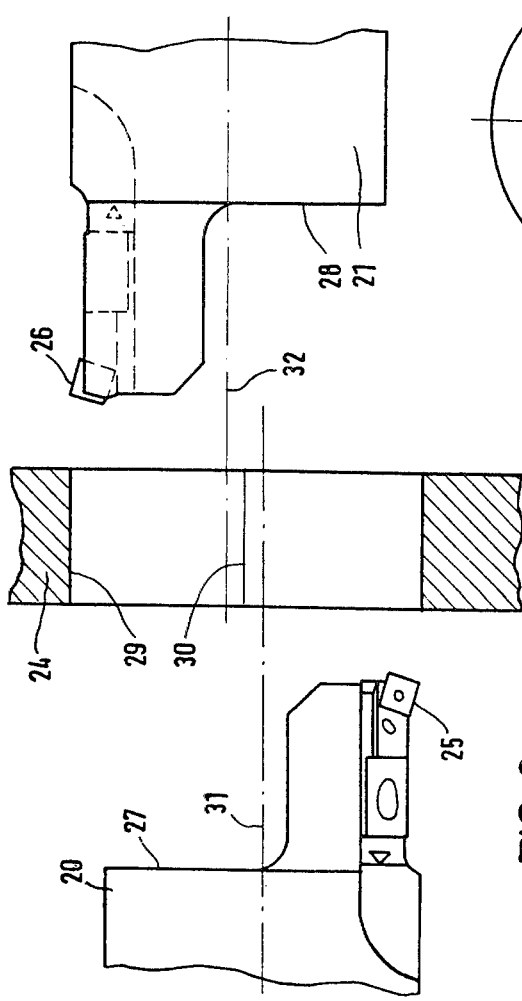
FIG. 2 shows an enlarged fragmentary view of the spindles shown in FIG. 1.
Figure 3:
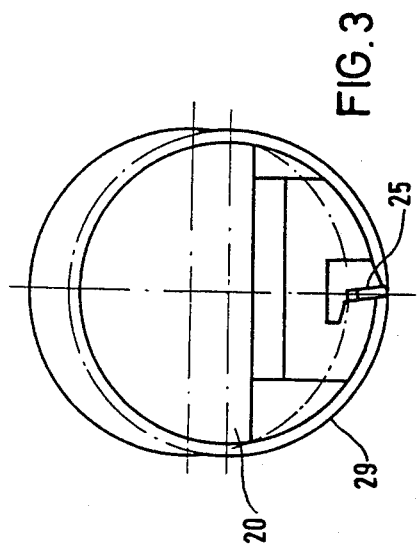
FIG. 3 shows a front view of a boring bar during an operation.

It is to be understood that the workpiece 24 to be subjected to the reaming or boring operation includes a bottom portion which is to be firmly clamped into a conventional fixture which is not illustrated in detail. The hole to be machined is designated by numeral 29 and the center line of such hole is indicated by numeral 30 in FIG. 2. In the preferred embodiment shown, hole 29 of oval shape is to be formed in the workpiece 24. For that purpose, the rotary axis 40 of the spindle 14 is separated from the rotary axis 50 of the spindle 15, whereas the central axis 30 of the hole 29 is maintained centrally between such axes.

In order that the boring bars 20, 21 shall be capable of passing each other during a hole-forming operation, it is necessary to have both bars coupled to the drive equalizing mechanisms 18,19 which synchronizes the rotation of both spindles. In this connection, FIGS. 4A–4F illustrate the relative portions of the spindles 14, 15 during one revolution.

The same apparatus as described above could in principal be applied also for the purpose forming a circular hole in a workpiece by orienting the axis of spindle 14 coaxially with the axis of the spindle 15 and also coaxially with the central axis of the hole. However, the same restriction regarding the construction of the machine as related before must be maintained, i.e., the spindle speeds must be locked to each other in order to ensure equal spindle speed and constant angle of rotation during operation.

Although the invention has been described in connection with a preferred embodiment thereof, it will be appreciated by those skilled in the art that additions; modifications, substitutions and deletions not specifically described may be made without departing from the spirit and scope of the invention as defined in the appended claims.

What is claimed is:

1. In a method of forming a hole in a workpiece by providing two mutually facing boring bars each having an axial recess and carrying an eccentric cutting insert, said inserts being of equal eccentricity, advancing said boring bars toward one another from opposite sides of the workpiece to bring said inserts into cutting engagement with said workpiece while rotating the boring bars at a mutually synchronized speed to maintain the insert of each boring bar aligned with the axial recess of the other boring bar, and continuing to advance and rotate said boring bars such that each insert enters said recess of the other boring bar and the inserts axially pass each other, the improvement comprising the step of:

forming said hole of preselected oval shape by rotating said boring bars about mutually spaced parallel axes of rotation that are spaced the same preselected distance from the axis of the oval hole being formed.

2. A method according to claim 8, wherein said cutting inserts are advaned within a previously-produced hole to shape or finish the latter.

3. Apparatus for forming a hole of preselected oval shape in a workpiece, comprising:

a pair of oppositely facing boring bars mounted for rotation about respective parallel axes, each boring bar, including:

an insert-carrying portion and an axially recessed portion, and a cutting insert mounted on said insert-carrying portion;

said cutting inserts being disposed at equal eccentricity relative to their respective axes of rotation, said axes of rotation being mutually spaced and spaced the same preselected distance from the axis of the oval hole being formed, means for rotating and advancing said boring bars toward one another from opposite sides of a workpiece to bring said inserts into cutting engagement with the workpiece, means for synchronizing the rotation of both spindles so that the insert-carrying portion of each drill is aligned with the recess of the other drill, to enable the inserts to axially pass each other.

* * * * *